United States Patent
Stolzer et al.

(10) Patent No.: US 10,596,645 B2
(45) Date of Patent: Mar. 24, 2020

(54) SAWING MACHINE AND METHOD FOR CONTROLLING A SAWING MACHINE

(71) Applicant: KEURO Besitz GmbH & Co. EDV-Dienstleistungs KG, Achern (DE)

(72) Inventors: Armin Stolzer, Baden-Baden (DE); Markus Oberle, Kappelrodeck (DE)

(73) Assignee: KEURO BESITZ GMBH & CO. EDV-DIENSTLEISTUNGS KG, Achern (DE)

( * ) Notice: Subject to any disclaimer, the term of this patent is extended or adjusted under 35 U.S.C. 154(b) by 922 days.

(21) Appl. No.: 14/706,275

(22) Filed: May 7, 2015

(65) Prior Publication Data

US 2015/0321274 A1  Nov. 12, 2015

(30) Foreign Application Priority Data

May 7, 2014  (DE) ........................ 10 2014 208 584

(51) Int. Cl.
| | | |
|---|---|---|
| *B23D 53/08* | (2006.01) | |
| *B23D 55/04* | (2006.01) | |
| *B23D 55/08* | (2006.01) | |
| *B23D 59/00* | (2006.01) | |

(52) U.S. Cl.
CPC ........... *B23D 59/001* (2013.01); *B23D 53/08* (2013.01); *B23D 55/046* (2013.01); *B23D 55/088* (2013.01); *Y10T 83/04* (2015.04); *Y10T 83/141* (2015.04)

(58) Field of Classification Search
CPC .. B23D 55/046; B23D 55/088; B23D 59/001; B23D 53/08; B23D 59/008
See application file for complete search history.

(56) References Cited

U.S. PATENT DOCUMENTS

| | | | | |
|---|---|---|---|---|
| 4,357,848 A | * | 11/1982 | Sakurai et al. | ........ B23D 55/06 83/360 |
| 4,358,974 A | * | 11/1982 | Sakurai | ................ B23D 55/088 700/175 |
| 4,437,367 A | | 3/1984 | Hauser | |

(Continued)

FOREIGN PATENT DOCUMENTS

| | | | |
|---|---|---|---|
| CN | 201848600 | * | 6/2011 |
| CN | 102151899 | * | 8/2011 |

(Continued)

*Primary Examiner* — Clark F Dexter

(74) *Attorney, Agent, or Firm* — Volpe and Koenig, P.C.

(57) ABSTRACT

A method for controlling a sawing machine is provided. For a first cut in a workpiece, a working feed rate that is specific to the workpiece geometry, the workpiece material and the sawing tool is defined in advance. During the first cut, an instantaneous value of a physical variable is determined at a frequency converter, that is related to the torque transmitted by the sawing tool drive to the sawing tool, and this value is transmitted as an instantaneous torque value to a machine controller. The instantaneous torque value is continuously evaluated, a maximum torque value of the first cut is determined and a maximum value for the torque value is defined based thereon. For subsequent cuts in the same workpiece, the working feed rate is regulated, using the instantaneous torque value as a regulating variable, such that the instantaneous torque value is kept constant, close to the maximum valve.

13 Claims, 6 Drawing Sheets

(56) References Cited

U.S. PATENT DOCUMENTS

| | | | | |
|---|---|---|---|---|
| 4,756,298 A | * | 7/1988 | Spiegelberg | B23D 47/10 125/14 |
| 4,944,643 A | * | 7/1990 | Lehmkuhl | B23B 31/006 279/145 |
| 5,043,907 A | * | 8/1991 | Richards | B23D 55/088 700/167 |
| 5,788,428 A | * | 8/1998 | Ward et al. | B23Q 5/10 318/566 |
| 6,682,062 B2 | | 1/2004 | Graushar et al. | |
| 2005/0109176 A1 | * | 5/2005 | Wilson | B23D 47/08 83/13 |
| 2014/0360322 A1 | * | 12/2014 | Oberle et al. | B23D 55/088 83/13 |

FOREIGN PATENT DOCUMENTS

| | | |
|---|---|---|
| DE | 3103243 | 1/1982 |
| DE | 19622374 | 12/1997 |
| DE | 10043012 | 5/2001 |
| EP | 1988438 | 11/2008 |
| EP | 2476531 | 7/2012 |

\* cited by examiner

SAWING MACHINE AND METHOD FOR CONTROLLING A SAWING MACHINE

INCORPORATION BY REFERENCE

The following documents are incorporated herein by reference as if fully set forth: German Patent Application No. DE 10 2014 208 584.5, filed May 7, 2014.

BACKGROUND

The invention relates to a method for controlling a sawing machine and to a sawing machine. Such a sawing machine, which is also used in the present method, comprises a sawing tool which is driven by an electrical sawing tool drive having a frequency converter. Also provided is a sawing feed device which moves the sawing tool at a variable feed rate relative to a workpiece to be sawn, by means of an electrical feed drive. The sawing machine finally also comprises a machine controller.

FIG. 6A illustrates an arrangement of a sawing machine 10 including a sawing tool 3 according to the prior art. As shown in FIG. 6A, a sawing feed device, which according to one embodiment is understood by one of ordinary skill in the art to include a guide 11, electrical feed drive 12, and frequency converter 13 is illustrated. An electrical sawing tool drive, which according to one embodiment is understood by one of ordinary skill in the art to include a frequency converter 14 and a motor 15 is also shown in FIG. 6A. FIG. 6B illustrates a circuit associated with the sawing machine 10 of FIG. 6A, according to the prior art, that includes the frequency converters 13, 14 connected to a machine controller 34. The circuit includes additional known circuit components such as a module 33, a bus 32, signal lines 35, 36, and an additional frequency converter 31.

Sawing machines of the present type are usually configured as band sawing machines or circular sawing machines, sometimes also as hack sawing machines. The main field of application of the present invention is that of cutting or sawing workpieces made of metal.

Depending on the type of sawing machine, the driven sawing tool, i.e. generally a sawing band or circular saw blade, is moved linearly or about a pivot axis relative to the workpiece. The workpieces are comparatively heavy and are usually placed by means of conveying devices on a sawing bench and clamped there for the sawing operation.

In this connection, workpieces having different cross sections can be sawn, essentially limited only by the maximum workpiece cross section which a particular sawing machine allows due to the geometrical specifications thereof. Furthermore, the workpieces can have different cross-sectional shapes or profiles, with for example cuboidal and cylindrical rods, and for example T-profiles and the like, often being processed on one and the same sawing machine.

A sawing operation begins with the positioning of the workpiece in a cutting position in which the point of the workpiece at which the latter is intended to be sawn off is located in a cutting plane which is defined by the sawing feeding movement of the sawing tool. The sawing tool then first of all has to be moved up to the workpiece at an idling feed rate, since, because workpieces with very different cross sections can be sawn, the sawing tool has to be removed entirely from the maximum possible working cross section of the sawing machine for the sake of safety. The actual cutting operation, i.e. the feeding movement of the sawing tool in material-removing engagement with the sawing tool in the workpiece, then takes place at a working feed rate which is dependent on the material properties and which, in the case of workpieces made of metal, is usually of the order of millimeters per second and is limited by the maximum machining power of the sawing tool.

In order to increase the efficiency of a sawing machine of the present type, the aim is to reduce the time required for a sawing operation. This can take place by increasing the idling feed rate of the sawing tool and/or by increasing the working feed rate of the sawing tool in the material.

In order to increase the idling feed rate, it is known to use sensors to determine the geometrical data of the workpiece to be sawn and to brake the sawing tool shortly before engagement in the workpiece. This prevents damage to the sawing tool if it meets the workpiece at an excessive idling feed rate. Other solution approaches proceed, in the case of a band sawing machine, from monitoring the sawing band and for example measuring the cutting resistance on the sawing band in order to brake the sawing tool as soon as the sawing band comes into contact with the workpiece and experiences corresponding resistance.

Further potential for saving the time required for a sawing operation arises when the working feed rate can be increased. This is also possible in the case of a predetermined maximum machining power of the sawing machine, specifically when workpieces having profiled cross sections, for instance a circular shape or a U-profile or T-profile, are intended to be sawn. This is because, with such cross sections or profiles, the working feed rate can be varied in order to reduce the time required for the actual cutting operation: for example in the case of a round material, i.e. a cylindrical workpiece, which has a circular shape in the section plane, only a few teeth are in each case simultaneously in engagement with the material at the beginning of the cutting operation. Approximately halfway through the cutting operation, the cutting tool, in particular a sawing band, runs along the diameter of the circular disk, and as many sawing teeth as possible are thus simultaneously in engagement with the material in this case. Toward the end of the cutting operation, the width of the sawn material decreases again, and so again fewer teeth are simultaneously in engagement with the material. The fewer teeth are simultaneously in engagement with the material, the higher the working feed rate can be selected to be at a given machining power.

The present invention deals with optimizing the working feed rate during the actual cutting operation.

For this purpose, it is known to select a sawing sequence program at the beginning of a sawing operation, said program being adapted to the cross-sectional type of the workpiece, for example the cross-sectional types of round material, square tube and the like. Since this is a typifying preselection, relatively large safety margins have to be taken into consideration, in particular when the workpiece is sawn in regions in which fewer teeth are expected to be in engagement with the material than in the case of the maximum width of the workpiece, that is to say in the regions in which sawing is carried out at an increased working feed rate, in order not to compromise the sawing tool for instance by an excessive working feed rate. In the example of a round material, these are the beginning and the end of the cutting operation; by contrast, in the example of a square tube, the region with the increased working feed rate is located between the beginning and the end of the cutting operation. When the working feed rate is varied, there is thus clearer potential for optimization.

There are already various approaches in the prior art for optimizing varying working feed rates: in DE 100 43 012

A1, the instantaneous load on a sawing band of a band sawing machine is detected by means of a force measuring sensor on the rear of the sawing band. The working feed rate is then regulated depending on the instantaneous load on the sawing band. Similar regulation is proposed in DE 31 03 243 A1: in said document, the instantaneous sagging of the sawing band in the cutting region is detected by means of sensors and a regulating variable for the working feed rate is derived therefrom. In U.S. Pat. No. 6,682,062 B1, the running profile of the sawing band or of the saw blade is measured and is used as a measured variable for the instantaneous load on the sawing tool. This again makes it possible to regulate the working feed rate.

A common feature of these solution approaches from the prior art is that sensors for measuring a regulating variable have to be present. However, in a sawing machine of the present type, harsh conditions prevail in the cutting region or in the region of the sawing bench, and so the use of sensors is always problematic and often not possible in a trouble-free manner.

SUMMARY

Therefore, the present invention is based on the object of proposing a method and a sawing machine of the type mentioned at the beginning, in which the working feed rate during the actual cutting operation is optimized without it being necessary to use sensors in the working region of the sawing machine for this purpose.

The present invention achieves this object by way of a method and by way of a sawing machine having one or more features of the invention. Preferred developments of the method according to the invention and advantageous configurations of the sawing machine according to the invention are described below and in the claims.

According to the present invention, a sawing machine which, as is known per se, comprises a sawing tool which is driven by an electrical sawing tool drive having a frequency converter, and a sawing feed device for moving the driven sawing tool at a variable feed rate relative to a workpiece to be sawn, by means of an electrical feed drive, is controlled according to the invention such that, for a first cut in a workpiece, a constant or varying working feed rate that is specific to the workpiece geometry, the workpiece material and the sawing tool is defined in advance, and then, during the first cut, an instantaneous value of a physical variable is determined at the frequency converter of the electrical sawing tool drive, said value being related to the torque transmitted by the sawing tool drive to the sawing tool. This value is transmitted as an instantaneous torque value to a machine controller and this instantaneous torque value is continuously evaluated there. In this connection, a maximum torque value of the first cut is determined and a maximum value for the torque value is defined on the basis thereof. For all the subsequent cuts in the same workpiece, the working feed rate of the sawing tool is then regulated, using the instantaneous torque value as a regulating variable (actual value), such that the instantaneous torque value is kept constant and is as close as possible to the maximum torque value (setpoint value).

Thus, according to the invention, for a first cut in a workpiece, the conventional procedure, in which the working feed rate of the driven sawing tool is preselected at an in particular constant value on the basis of empirical values or on the basis of a table provided ex factory with the sawing machine, is carried out, and the cutting operation takes place at this working feed rate. In order to reduce the time required for the first cut, it is also possible, as is known per se, for a varying working feed rate to be defined in advance, said feed rate being selected on the basis of typifying cross-sectional shapes, wherein, for example in the case of a round material, the preselected working feed rate is increased at the beginning and toward the end of the cutting operation.

The working feed rate, which according to the invention is defined in advance for the first cut, is specifically selected for the workpiece geometry, the workpiece material and the sawing band, i.e. the machining power of the sawing tool in a particular workpiece material and, for example, the maximum width of the workpiece as workpiece geometry have some influence in the selection. The maximum width of the workpiece can be automatically determined by the machine controller on the basis of the distance between two clamping jaws of the sawing machine, said clamping jaws clamping the workpiece for the sawing operation. As mentioned, in addition to the maximum width of the workpiece, it is also possible to use the basic form thereof in order to select an in particular varying specific working feed rate.

During this conventionally carried out first cut in the workpiece, an instantaneous value of a physical variable is continuously determined at the first frequency converter of the sawing tool drive, said value being related to the torque transmitted by the sawing tool drive to the sawing tool. This physical variable can be in particular an active current emitted from the first frequency converter to a motor of the electrical sawing tool drive.

In the case of a constant or varying working feed rate that is conventionally defined in advance, said feed rate can only be optimal or be close to the optimal, i.e. maximum admissible, load on the sawing tool when that point of the workpiece at which the maximum number of sawteeth is in engagement with the material of the workpiece is sawn, i.e. generally the widest point of the workpiece. At the remaining points of the workpiece, the working feed rate can only be increased with considerable safety margins. During a first cut, which according to the invention is carried out with a conventionally preselected working feed rate, there will thus be a maximum of the physical variable determined at the frequency converter of the sawing tool drive; this is because, due to the safety margins when the working feed rate is varied, the torque transmitted by the sawing tool drive to the sawing tool is greatest when the maximum number of saw teeth is in engagement with the material. If a constant working feed rate is selected for the first cut, this arises even without safety margins. This maximum is simultaneously determined at a time during the cutting operation at which the working feed rate is substantially optimal, since, at this feed rate, the torque transmitted to the sawing tool is as large as possible without damaging the sawing tool.

Since the instantaneous value, determined at the frequency converter, of the physical variable is transmitted to the machine controller as an instantaneous torque value, said machine controller can determine a maximum torque value of the first cut by continuously evaluating the received instantaneous torque values and can use said maximum torque value as the basis for defining a maximum value for the torque value. In this case, it is not necessary according to the invention for the absolute value of the torque emitted to the sawing tool by the sawing tool drive to be known; it is thus also not necessary to use any sensors or sensing elements.

Finally, for all the subsequent cuts in the same workpiece, the working feed rate is regulated according to the invention using the instantaneous torque value as a regulating variable (actual value) such that the instantaneous torque value is kept constant and is as close as possible to the maximum value (setpoint value) determined during the first cut or defined thereafter. Thus, for all the subsequent cuts in the same workpiece, optimum regulation of sawing-through is carried out, wherein, in order to increase the working feed rate in the case for example of thin profile sections, safety margins no longer have to be applied. This is because, on the basis of the feedback from the frequency converter, this feedback allowing conclusions to be drawn in real time with regard to the resistance generated by the contact between the sawing tool teeth and the workpiece, a particularly quick reaction of the feed drive to the changing conditions at the saw tip can be achieved; in particular, the working feed rate is down-regulated in real time as soon as the resistance in the sawn workpiece increases and, as a reaction thereto, the sawing tool drive emits a higher torque to the sawing tool.

The present invention thus makes it possible to vary the working feed rate of a sawing machine in an optimized manner during the actual cutting operation, even without it being necessary to use sensors or transducers and even without absolute values for the torque emitted by the sawing tool drive to the sawing tool being known. Empirical values or specified values for maximally admissible working feed rates are sufficient for a given workpiece material, a given sawing tool and a given workpiece width.

In a preferred configuration of the method according to the invention, the present invention furthermore makes it possible to detect wear to the sawing tool during the sawing of a number of cuts in a workpiece. To this end, during each cut or in cuts selected on a random basis, the working feed rate regulated to the maximum value for the torque value is compared with the recorded working feed rate in one or more preceding cuts. Since the maximum value for the torque value does not change as the setpoint value of the regulation, it is possible to infer wear to the sawing tool from a reduction in the working feed rate resulting from the regulation and optionally even to determine the degree of wear.

Further advantages arise with the present invention even when, for a particular combination of boundary conditions: workpiece geometry, workpiece material and sawing tool, empirical values or specified values already exist for the torque values that can be read from the frequency converter under normal other boundary conditions, in particular for the maximum torque value. This is because it is then possible for the maximum torque value determined in the first cut to be compared with a maximum torque value, taken from a database or list, for a comparable workpiece geometry, a comparable workpiece material and a comparable sawing tool. If there are deviations in this connection, it is possible to infer workpiece inhomogeneities, workpiece deviations, workpieces wrongly selected by an operator and/or wear to the sawing tool from the deviations.

Additional optimizations of the working feed rate can be achieved with a further development of the present invention: if a substantially constant working feed rate is defined for the first cut, the exact profile of the sawn workpiece and any inhomogeneities therein which increase the sawing resistance can be determined from the ongoing evaluation of the instantaneous torque value output from the frequency converter. This precise knowledge of the relevant sawing resistances at any time during the cutting operation in the workpiece advantageously makes it possible to optimize, in particular to reduce, the generally required safety margins when the maximum value of the torque value, to which regulation takes place in the subsequent cuts, is defined, in order to be able to achieve a greater working feed rate overall.

If the relationship between the physical variable determined at the first frequency converter and the absolute value of the torque transmitted in this connection to the sawing tool is known, a modification of the present invention, according to which the machine controller continuously compares the instantaneous torque value with a drive-specific threshold torque value and lowers the feed rate of the sawing tool if the instantaneous torque value exceeds the threshold torque value, is advantageous. This prevents the sawing tool from indeed being loaded by an excessive torque and prevents in particular damage to the sawing tool due to operating errors.

Finally, it is advantageous for the value of the physical variable determined at the first frequency converter to be subjected to a filtering process in order to smooth its variation over time; this is because, since the value of the physical variable reproduces the profile of the torque at the sawing tool drive in real time, extremely brief fluctuations, which do not have to be taken into consideration by the motor controller, and optionally also should not be taken into consideration, can occur. Smoothing represents a type of damping member in the controlled system.

BRIEF DESCRIPTION OF THE DRAWINGS

An exemplary embodiment of a sawing machine according to the invention, which is operated by way of a method configured according to the invention, is explained and described in more detail in the following text with reference to the appended drawings, in which.

DETAILED DESCRIPTION OF THE PREFERRED EMBODIMENTS

Figure 1:
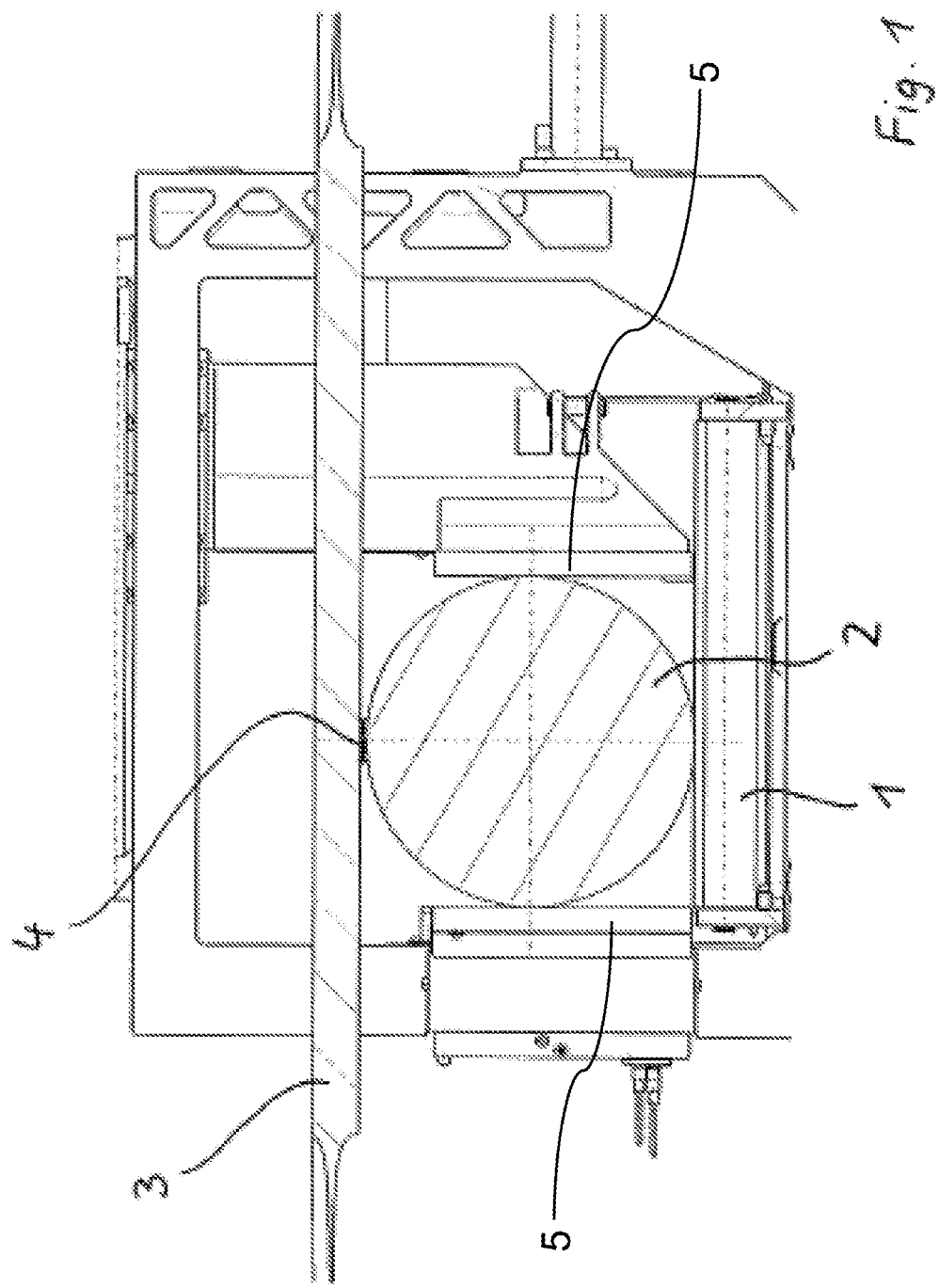
FIG. 1 shows a schematic illustration of a sawing bench of a band sawing machine, having an inserted workpiece (round rod) at the beginning of the cutting operation.

FIG. 1 schematically illustrates a sawing bench 1 of a band sawing machine. A workpiece 2, in this case a cylindrical bar, is resting on said sawing bench 1 and is clamped in clamping jaws 5. Above the workpiece, a sawing band 3 circulates endlessly as the sawing tool about two deflection rollers (not illustrated) of a raisable and lowerable upper saw part. The sawing band moves from right to left in the drawing plane in the selected illustration.

The time illustrated in FIG. 1 is the beginning of the actual cutting operation: the sawing band 3 moves downwardly in a feeding movement in a cutting plane which coincides with the drawing plane in the selected illustration, and has come into planar contact with the workpiece 2. Within an engagement section 4, the sawing band 3 is in engagement with the material of the workpiece 2 and divides the latter by way of the material-removing action of the saw teeth attached to the lower end of the sawing band 3.

Figure 2:
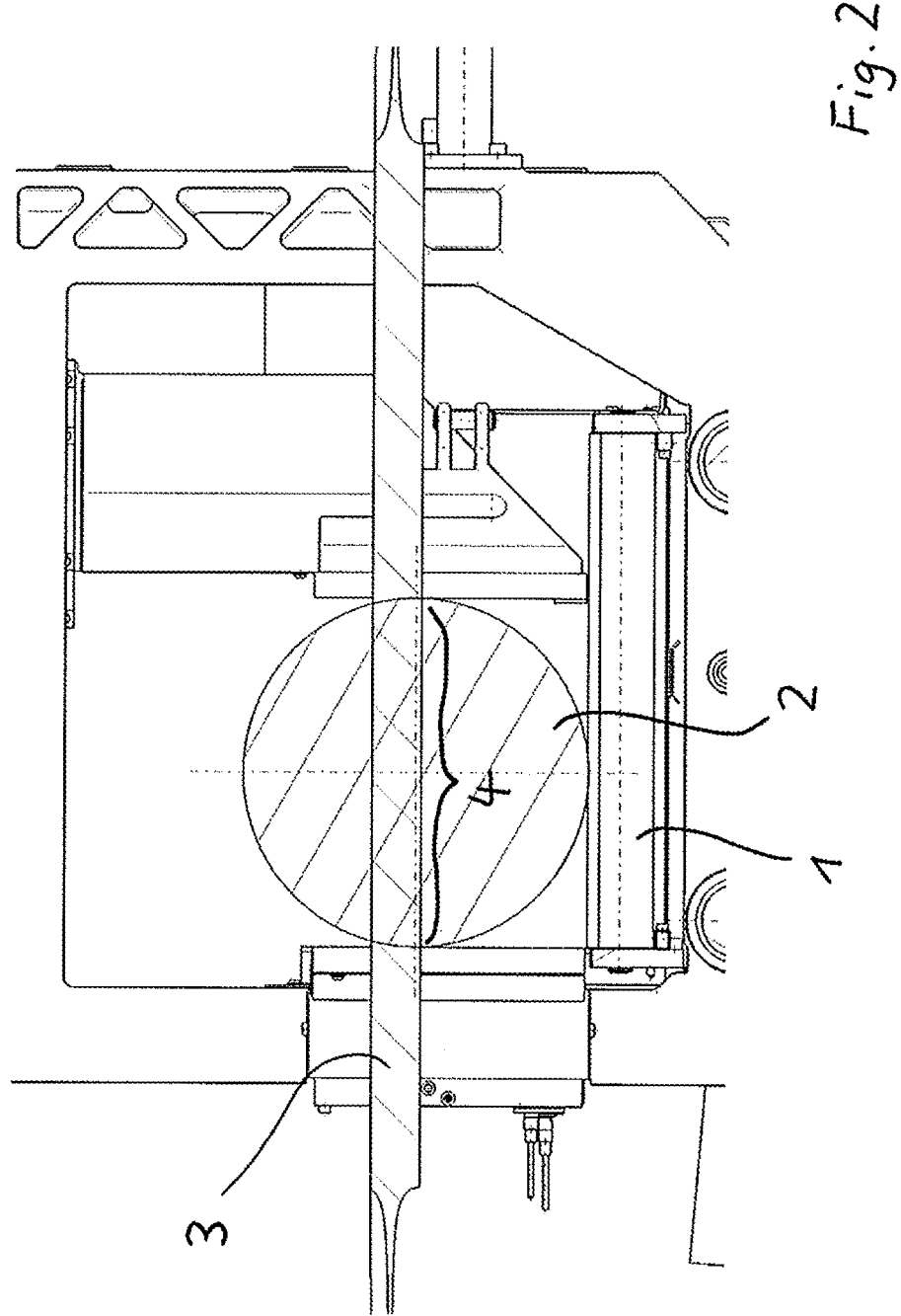
FIG. 2 shows an illustration like FIG. 1, but during the cutting operation.

FIG. 2 illustrates a later time during the cutting operation. In this case, the sawing band 3 is located approximately in the middle of the cross section of the workpiece 2 such that the engagement length 4 is in this case much greater than at the beginning of the cutting operation, which is illustrated in FIG. 1. Accordingly, at the time illustrated in FIG. 2, substantially more saw teeth of the sawing band 3 are in engagement with the material of the workpiece 2 than at the beginning of the cutting operation, illustrated in FIG. 1, or toward the end of the cutting operation (not illustrated). Accordingly, the sawing band 3 experiences much greater resistance, at the time illustrated in FIG. 2 than at the time illustrated in FIG. 1, such that, at a given working feed rate of the sawing band 3, a correspondingly higher torque has to be emitted by the sawing tool drive to the sawing band 3 in order to keep the sawing tool at the setpoint speed. Conversely, at a given, optimal torque which is emitted to the sawing band 3, the working feed rate can be selected to be very much higher at the time illustrated in FIG. 1 than at the time illustrated in FIG. 2.

Figure 3:
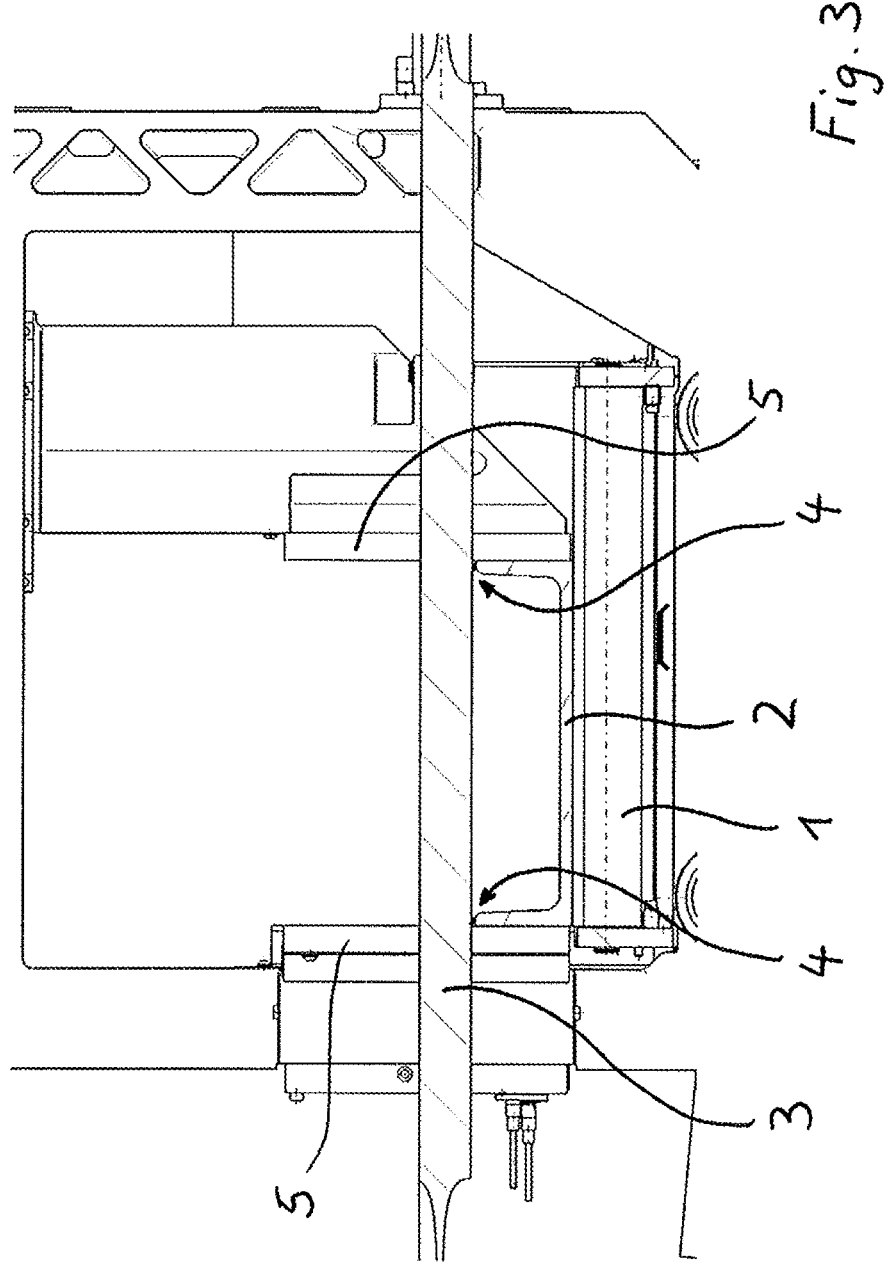
FIG. 3 shows an illustration like FIG. 1, but with a different inserted workpiece (C-profile), at the beginning of the cutting operation.
Figure 4:
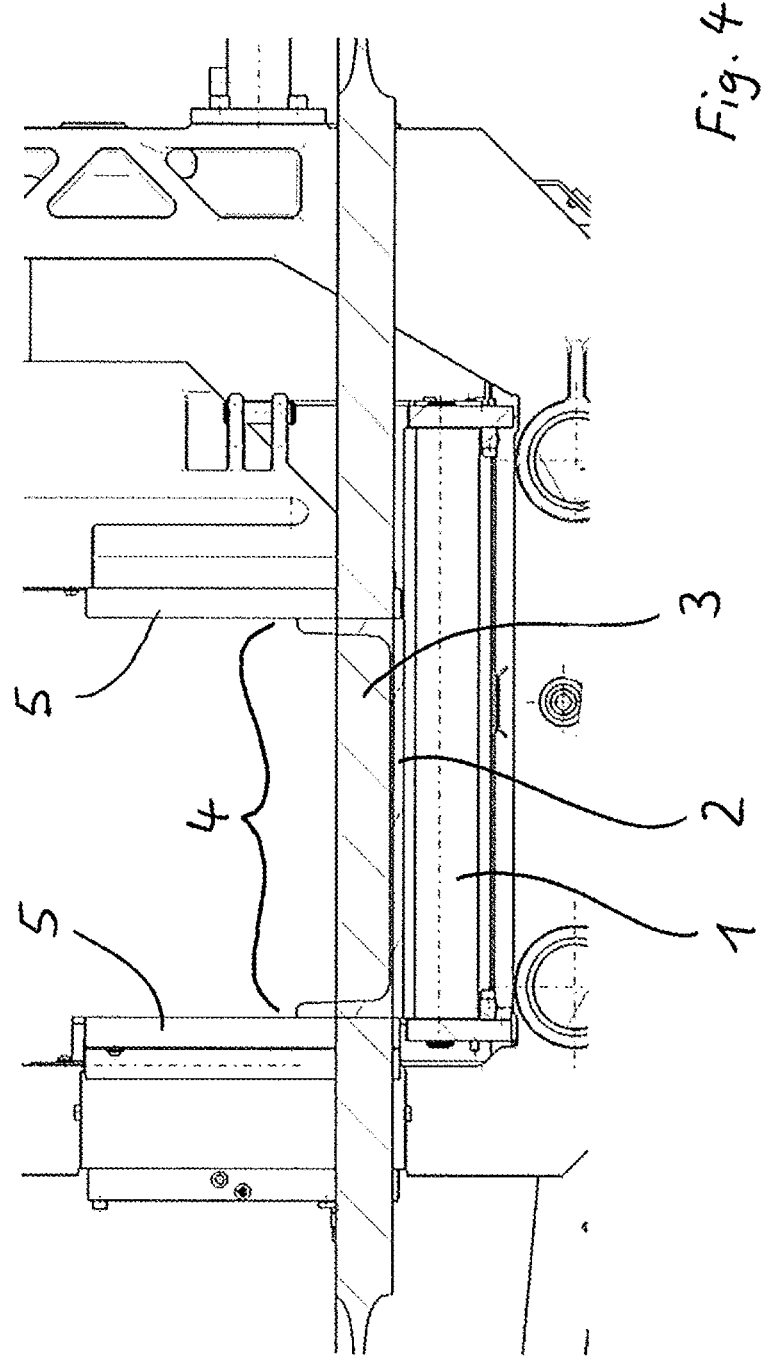
FIG. 4 shows an illustration like FIG. 3, but toward the end of the cutting operation.

Corresponding circumstances are illustrated in FIGS. 3 and 4, which in turn schematically show the sawing bench 1 of the band sawing machine of FIG. 1, with a workpiece 2' resting on said sawing bench 1. On this occasion, this workpiece 2' has a C-profile which is clamped in the clamping jaws 5 of the sawing machine for the sawing operation.

FIG. 3 again shows the time at the beginning of the actual cutting operation, at which the sawing band 3 comes into engagement with the material of the workpiece 2', while FIG. 4 again shows a time during the cutting operation, at which the maximum engagement length 4 of the given tool shape is sawn and accordingly the maximum number of saw teeth is simultaneously in engagement with the material of the workpiece 2'.

In the case of the present C-shaped workpiece 2', there is a particularly large amount of optimization potential for varying the working feed rate of the saw band 3, since only two small engagement lengths 4 of engagement between the sawing band 3 and the workpiece 2' are provided for virtually the entire sawing operation, while a high resistance acts on the sawing band 3 only toward the end of the sawing operation, when the sawing band 3 engages into the back of the C of the profiled workpiece 2', and the working feed rate accordingly has to be slowed down.

In order to carry out the method according to the invention, all that is necessary, for example in the exemplary embodiment illustrated in FIGS. 3 and 4, is for the material of the workpiece 2' and optionally the type and size of the sawing band 3 to be entered into the machine controller at the beginning of the sawing operation. Due to the position of the clamping jaws 5, which clamp the workpiece 2' for the sawing operation, the machine controller knows the maximum width of the workpiece 2' and can select a working feed rate which is specifically known to be optimal for the workpiece width, the workpiece material and the sawing tool.

With this determined constant working feed rate, the first cut of the workpiece 2' is carried out in a constant manner. In this connection, at the time illustrated in FIG. 4, a maximum of a physical variable is detected at the frequency converter of the sawing tool drive, since, at the given working feed rate, the torque emitted by the sawing tool drive to the sawing band 3 is greatest at this point.

Even without knowing the absolute values of the actually emitted torque or of the forces actually acting on the sawing band 3, it is now possible to use an optimally varying working feed rate for all the subsequent cuts, since the machine controller regulates the working feed rate such that a torque is continuously emitted to the sawing band 3 by the sawing tool drive, said torque corresponding to a maximum value determined during the first cut. Due to the real-time feedback of the torque value via the frequency converter of the sawing tool drive, the sawing band 3 cannot be damaged even at the transition from the legs of the C to the back of the C of the workpiece 2', since the working feed rate is down-regulated extraordinarily quickly due to the feedback from the frequency converter.

Figure 5:
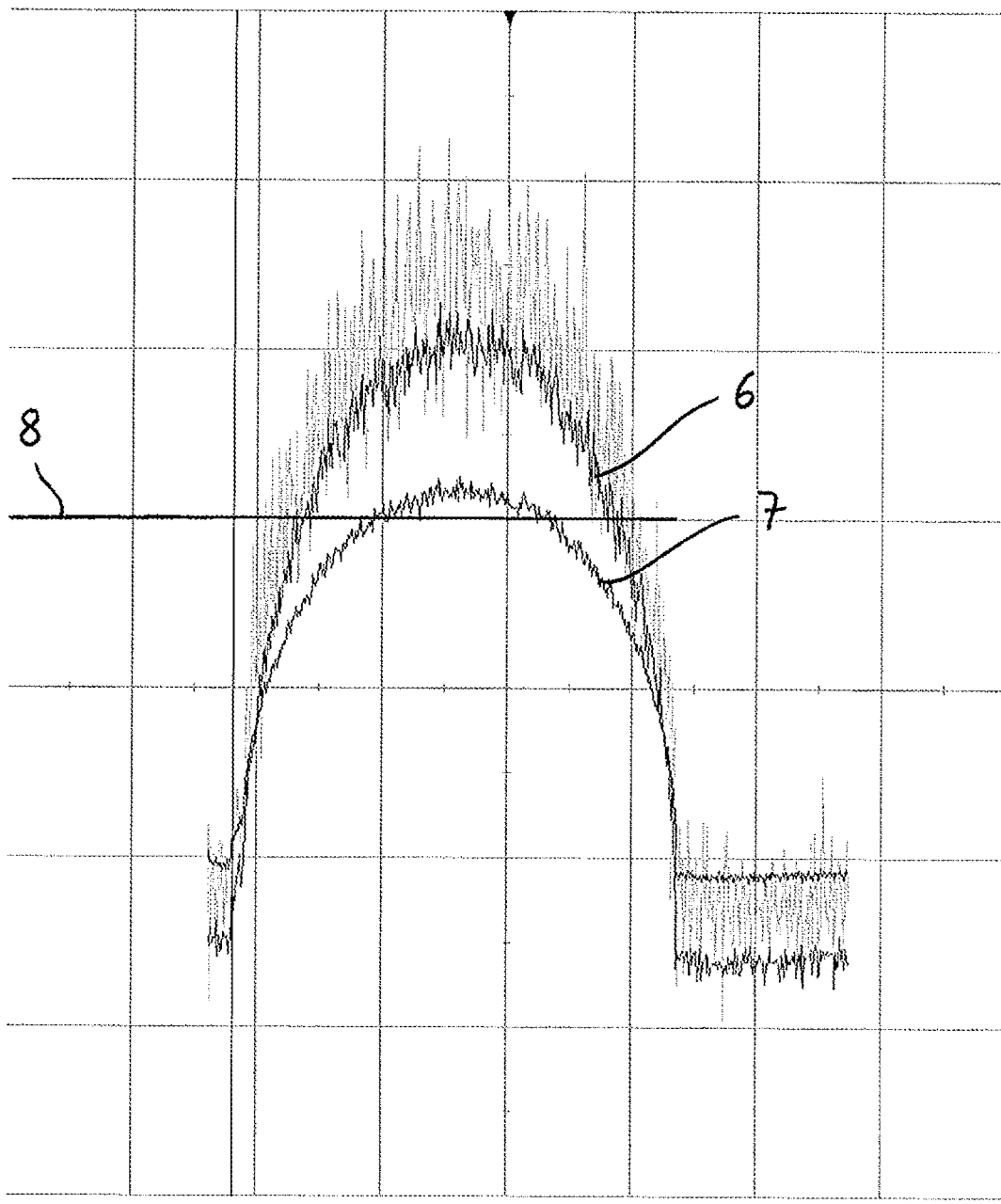
FIG. 5 shows a diagram of an evaluation of the instantaneous torque value determined at the sawing tool drive.
Figure 6A:
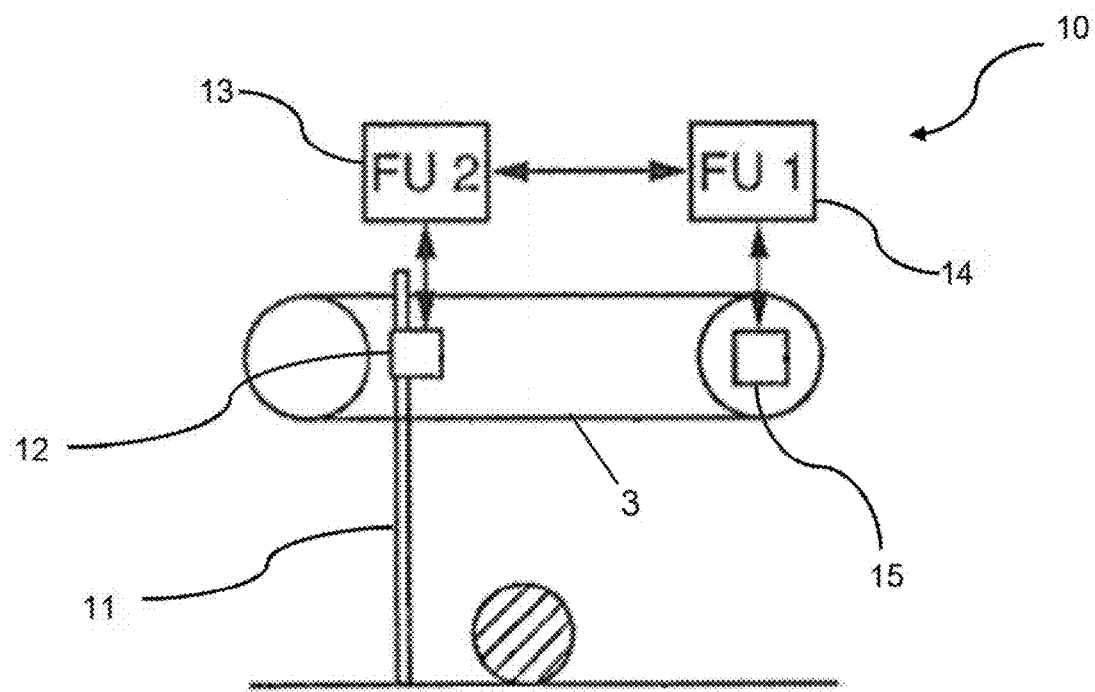
FIG. 6A shows a schematic representation of components of a sawing machine according to the prior art.
Figure 6B:
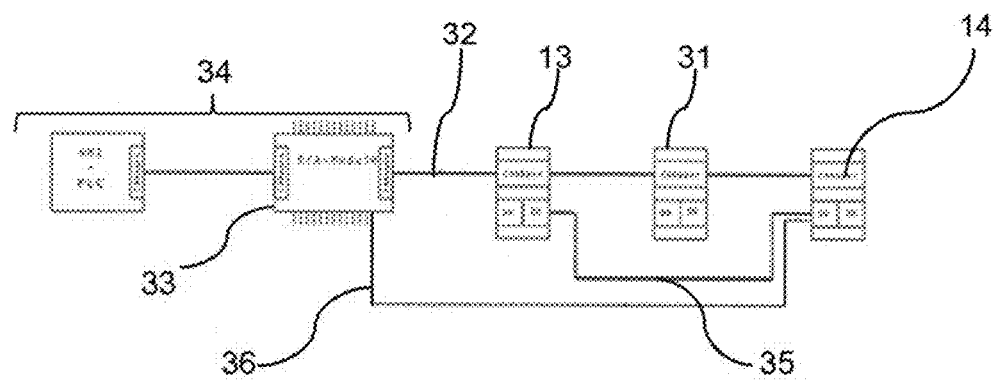
FIG. 6B shows a schematic basic circuit diagram of a control for drives of a sawing machine according to the prior art.

FIG. 5 shows a measurement diagram during the evaluation of the instantaneous torque values 6, 7 registered at the machine controller before (reference sign 6) and after (reference sign 7) filtering. This is the evaluation of a first sawing cut in the configuration illustrated in FIGS. 1 and 2, i.e. of a sawing cut in a cylindrical workpiece 2 at a constant working feed rate. It is clearly apparent that the torque value 6 and the filtered torque value 7 respectively reach a maximum when approximately the middle of the workpiece 2 is being sawn, as illustrated in FIG. 2.

On the basis of this maximum, taking into account a small safety margin, the machine controller defines a maximum torque value 8 by way of which the working feed rate is then regulated for all the subsequent cuts in the same material.

The invention claimed is:

1. A method for controlling a sawing machine, which includes a sawing tool (3), an electrical sawing tool drive having a frequency converter, and a sawing feed device, the sawing tool (3) being driven by the electrical sawing tool drive, the method comprising:
    moving the driven sawing tool (3) by the sawing feed device at a constant or varying feed rate relative to a workpiece (2) to be sawn using an electrical feed drive of the sawing feed device,
    said moving the driven sawing tool (3) includes cutting the workpiece (2) with the sawing tool (3) at a constant or varying working feed rate, wherein for a first cut in the workpiece (2), defining in advance a constant or varying initial working feed rate that is specific to a workpiece geometry, a workpiece material and the sawing tool (3),
    during the first cut, determining an instantaneous value of a physical variable at the frequency converter, said value corresponding to a torque transmitted by the sawing tool drive to the sawing tool (3), and continuously evaluating said value as an instantaneous torque value (6), determining a maximum torque value of the first cut and defining a maximum torque value (8) for subsequent cuts on a basis thereof, using an active current emitted by the frequency converter to a motor of the sawing tool drive as the physical variable,
    and for all the subsequent cuts in the same workpiece (2), regulating the working cutting feed rate using the instantaneous torque value (6) as a regulating variable, such that the instantaneous torque value (6) is kept constant and is as close as possible to the defined maximum torque value (8).

2. The method according to claim 1, further comprising clamping the workpiece (2) between two clamping jaws (5) of the sawing machine for the sawing operation, determining the maximum width of the workpiece (2) based on a distance between the two clamped jaws (5), and for the first cut in the workpiece (2), using the maximum width of the workpiece (2) as the workpiece geometry in order to define the constant or varying initial working feed rate in advance.

3. The method according to claim 2, further comprising that, in addition to the maximum width of the workpiece (2), also using a basic form of the workpiece in order to define the constant or varying initial working feed rate in advance.

4. The method according to claim 1, further comprising continuously comparing the instantaneous torque value (6) with a drive-specific threshold torque value, and lowering the working feed rate of the sawing tool (3) if the instantaneous torque value (6) exceeds the threshold torque value.

5. The method according to claim 1, further comprising filtering a value of the physical variable determined at the frequency converter in order to smooth variations over time.

6. The method according to claim 1, further comprising, during each cut or in cuts selected on a random basis, comparing the working feed rate regulated to the maximum value (8) for the torque value with the working feed rate in one or more of the preceding cuts, in order to detect wear on the sawing tool (3).

7. The method according to claim 1, further comprising comparing the maximum torque value determined in the first cut with a maximum torque value taken from a database or list for a comparable workpiece geometry, a comparable workpiece material, and a comparable sawing tool (3), in order to at least one of detect material inhomogeneities, material deviations, or wear on the sawing tool (3).

8. The method according to claim 1, further comprising, for the first cut, defining the constant or varying initial working feed rate as a substantially constant working feed rate, and determining a profile of the sawn workpiece (2) from the ongoing evaluation of the instantaneous torque value (6) that results therefrom, in order to optimize safety margins in defining the maximum value (8) for the torque value.

9. A sawing machine comprising:
a sawing tool (3),
an electrical sawing tool drive having a frequency converter for driving the sawing tool (3),
a sawing feed device having an electrical feed drive, the sawing feed device adapted to move the driven sawing tool (3) at a constant or varying feed rate relative to a workpiece (2) to be sawn, and
a machine controller operatively connected to the sawing tool drive and the sawing feed device, the machine controller being configured to use a constant or varying working feed rate during cutting of the workpiece (2), wherein, for a first cut in the workpiece (2), the machine controller uses a constant or varying initial working feed rate defined in advance that corresponds to a workpiece geometry, a workpiece material, and the sawing tool (3),
wherein the frequency converter is configured such that, during the first cut, the frequency converter transmits an instantaneous value of a physical variable to the machine controller, said value corresponding to a torque transmitted by the sawing tool drive to the sawing tool (3), the machine controller continuously evaluating said value as an instantaneous torque value (6), the physical variable is an active current emitted by the frequency converter to a motor of the sawing tool drive,
the machine controller is further configured such that it continuously evaluates the value that corresponds to the instantaneous torque value (6) received from the frequency converter, determines a maximum torque value of the first cut, and defines a maximum torque value (8) for subsequent cuts based thereon,
and, for all the subsequent cuts in the same workpiece (2), the machine controller is configured to regulate the working feed rate using the instantaneous torque value (6) as a regulating variable, such that the instantaneous torque value (6) is kept constant and is as close as possible to the defined maximum torque value (8).

10. The sawing machine according to claim 9, wherein the machine controller is configured to determine the maximum width of the workpiece based on a distance between two clamping jaws (5) of the sawing machine when the clamping jaws (5) are clamping the workpiece (2) for the sawing operation, and the machine controller is further configured such that, for the first cut in the workpiece (2), the machine controller uses a maximum width of the workpiece (2) as the workpiece geometry in order to define the constant or varying initial working feed rate in advance.

11. The sawing machine according to claim 10, wherein the machine controller is further configured such that, in addition to the maximum width of the workpiece (2), it also uses a basic form of the workpiece in order to define the constant or varying initial working feed rate in advance.

12. The sawing machine according to claim 10, wherein the machine controller is further configured such that it continuously compares the instantaneous torque value (6) with a drive-specific threshold torque value and lowers the working feed rate of the sawing tool (3) if the instantaneous torque value (6) exceeds the threshold torque value.

13. The sawing machine according to claim 9, wherein the machine controller is configured to filter the value of the physical variable determined at the frequency converter in order to smooth its variation over time.

* * * * *